(12) United States Patent
Funahashi

(10) Patent No.: US 6,813,365 B1
(45) Date of Patent: Nov. 2, 2004

(54) IMAGE CONFIRMING METHOD

(75) Inventor: Takeshi Funahashi, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/281,965

(22) Filed: Mar. 31, 1999

(30) Foreign Application Priority Data

Mar. 31, 1998 (JP) .......... 10/087144

(51) Int. Cl.$^7$ .......... G06K 9/00
(52) U.S. Cl. .......... 382/100; 378/4; 378/27; 600/300
(58) Field of Search .......... 382/100, 128, 382/129, 130, 131, 132, 133; 378/4, 37, 51, 54, 61, 62; 600/300, 407, 411, 425, 427

(56) References Cited

U.S. PATENT DOCUMENTS

| | | | | |
|---|---|---|---|---|
| 4,767,205 A | * | 8/1988 | Schwartz et al. | 356/71 |
| 5,019,975 A | * | 5/1991 | Mukai | 707/7 |
| 5,235,510 A | * | 8/1993 | Yamada et al. | 600/300 |
| 5,464,410 A | * | 11/1995 | Skeens et al. | 606/130 |
| 5,950,045 A | * | 9/1999 | Numura et al. | 399/81 |
| 5,995,097 A | * | 11/1999 | Tikumine et al. | 345/331 |
| 6,101,263 A | * | 8/2000 | Shimizu et al. | 382/100 |
| 6,125,194 A | * | 9/2000 | Yeh et al. | 382/132 |
| 6,188,782 B1 | * | 2/2001 | Le Beux | 382/128 |
| 6,198,837 B1 | * | 3/2001 | Sasano et al. | 382/132 |
| 6,212,299 B1 | * | 4/2001 | Yuge | 382/231 |

* cited by examiner

Primary Examiner—Bhavesh M. Mehta
Assistant Examiner—Abolfazl Tabatabai
(74) Attorney, Agent, or Firm—Sughrue Mion, PLLC

(57) ABSTRACT

Quality of a plurality of images having a common characteristic is confirmed collectively and the images after the confirmation are transferred collectively. Images acquired by a reading apparatus are input to a workstation and stored in a recording apparatus. At the time of image confirmation, the workstation groups image data representing the images stored in the recording apparatus into image groups classified by examination. For an image group including a plurality of images, the images included therein are displayed and their quality is judged by comparison therebetween. When the images are judged to be appropriate, the images are transferred collectively as the image group to a transfer destination apparatus.

18 Claims, 3 Drawing Sheets

IMAGE CONFIRMING METHOD

BACKGROUND OF THE INVENTION

1. Field of the Invention

The present invention relates to a method of confirming an image based on image data prior to transfer of the image data to a predetermined destination.

2. Description of the Related Art

In the field of medicine, various kinds of diagnostic image generating apparatuses (modalities) using X rays or the like have been in use, and CR (Computed Radiography) apparatuses, CT (Computed Tomography) apparatuses, MRI (Magnetic Resonance Imaging) apparatuses and the like have been put into practice. An image (image data) generated by a modality of such a kind is used in a medical facility for diagnosis of a lesion or injury, or the degree thereof, by being displayed on a CRT display (hereinafter simply called "CRT") or output on a film by an LP (Laser Printer).

A CR apparatus herein referred to means a radiation image reading recording apparatus. A CR apparatus uses a stimulable phosphor which emits light upon exposure to a stimulating ray such as visible light or an infrared ray in accordance with radiation energy stored in a stimulable phosphor sheet. Radiation image information recorded in the stimulable phosphor sheet is obtained by scanning the sheet with a stimulating ray to cause the sheet to emit light, and the emitted light is read photoelectrically as an image signal by the CR apparatus. Recently CR apparatuses have become widely used and put into practice.

Following the recent advancement in technologies in the field of communications and computers, medical network systems using computers have been installed in hospitals. Each apparatus described in the above, which used to be used only in a stand alone mode, can now be used on a network. A modality is set as an image data acquiring apparatus, and an LP is connected to the image data acquiring apparatus as an output apparatus. A diagnostic image reading terminal for displaying an image for diagnostic purposes is placed as an apparatus to receive the image in a room remote from the location of the image data acquiring apparatus. The image data acquiring apparatus and the image reading terminal are connected via a network so that medical doctors can carry out diagnosis at a location remote from the image data acquiring apparatus.

However, in a conventional medical network system such as the one described above, image data obtained by the image data acquiring apparatus are transferred automatically to the image reading terminal connected to the network, and image confirmation based on the obtained image data prior to the transfer has rarely been carried out. Therefore, even when there is a mistake in photographing, or photographing has not been carried out at an appropriate density, for example, image data having such a problem are all transferred to the image reading terminal, and the problem is found only at the time of diagnosis, which causes a problem with the diagnosis.

It is possible to display images based on obtained image data one by one on a image inspecting workstation or the like to confirm the quality of an image before the transfer of the image data to the image reading terminal and to transfer only the image data having been judged to be appropriate. In this method, even if a plurality of images for one patient (for example, images photographed at slightly different angles) are photographed by using one or a plurality of apparatuses, quality of each image is confirmed and the image is transferred one by one. Therefore, it is necessary for the image reading terminal to acquire necessary image data (in the above example, data of images photographed at different angles) through a search of separately transferred image data and to display the images based on the obtained image data, which is not convenient for diagnostic purposes. Furthermore, since collective management or confirmation of images obtained by a medical examination of one patient is not carried out, it is insufficient to confirm image quality one by one and to transfer thereafter, in the case where image quality judgment obtained only through comparison between a plurality of images is necessary (for example, in the case where one image needs sharper contrast or darker density overall) or in the case where more images are necessary for more precise diagnosis (for example, in the case where an image of a different portion is necessary or an image at a different angle is necessary).

SUMMARY OF THE INVENTION

The present invention has been created based on consideration of the above problems. An object of the present invention is to provide an image confirming method wherein the quality of an image is confirmed based on image data, and not only image quality judgment which cannot be obtained through confirmation of each image upon transfer of the image data to an image reading terminal but also easy specification, transfer, and display of confirmed image data are possible.

An image confirming method of the present invention comprises:

a grouping step wherein a plurality of images are classified into image groups each of which has a common characteristic; and a confirmation step wherein, regarding each image group including a plurality of images and classified in the grouping step, quality of the images in the image group is confirmed by referring to other images in the image group, and is characterized by the fact that predetermined processing can be carried out on the image group having been confirmed.

The "group classified in the grouping step" includes a group comprising only one image classified in the grouping step and having no other images with common characteristics.

As a result of the grouping, all images can be included in one group or only one image group may have a plurality of images. However, the case where image quality is judged only regarding the only image group is included as a case of judgment "regarding each image group".

Furthermore, another image confirming method of the present invention comprises:

a first grouping step wherein, regarding image classes each of which includes a plurality of images, the images included in each image class are grouped into image subgroups each of which has a common characteristic;

a second grouping step wherein, regarding the image subgroups grouped in the first grouping step, image subgroups having the same characteristic of the images included therein are grouped together to form an image group, and an image subgroup having no other image subgroups with common characteristics remains as it is; and a confirmation step wherein, regarding each image group grouped in the second grouping step and having a plurality of images, quality of each image therein is confirmed by referring to other images in the image group; and is characterized by the fact that predetermined processing can be carried out on each image group or subgroup grouped in the second grouping step.

The "image subgroups grouped in the first grouping step" includes an image subgroup classified in the first grouping step comprising only one image and having no other images with common characteristics.

The "characteristic" in the above means the kind of image such as a patient's name, an object of examination (a class medical check-up, or a close examination or the like), an examined body portion (chest, stomach, for example), and the like. The groups grouped in the grouping step are the groups including images of the same patient name, or the same examination object, or the same body portion.

To confirm image quality by "referring to other images in the image group" means to carry out image quality confirmation which cannot be carried out by observation of a single image. For example, it means to confirm whether or not all images in the image group have desired image quality by observing all the images in the image group or by comparison between each of the images (for example, judgment as to whether one image needs sharper contrast or as to whether the density of all images needs to be higher), or to confirm whether or not all the images are sufficient for diagnosis (for example, judgment as to whether images of different body portions or at different angles are necessary).

Furthermore, the "predetermined processing" can be any processing as long as the processing is appropriate to process all images in the image group. For example, the processing means processing such that, by specifying a group including a plurality of images classified by the name of a patient, an object of examination, a body portion to be examined or the like, all images can be selected, displayed, or transferred if image selection, image display, or image transfer is instructed.

According to the image confirming method of the present invention, image data obtained by image data acquiring apparatus are classified into image groups each of which has a common characteristic (such as the name of a patient or an object of examination) and when a plurality of images exist in an image group, the images are confirmed by overall observation or comparison between each other. Therefore, image confirmation which cannot be obtained by observation of a single image can be carried out. Furthermore, it is possible to deal with all confirmed images collectively as a group. Therefore, image specification or transfer can be carried out in a unit of image group, and it becomes possible to specify, transfer, or display the confirmed image data easily.

DESCRIPTION OF THE PREFERRED EMBODIMENTS

Hereinafter, embodiments of an image confirming method of the present invention will be explained with reference to the accompanying drawings.

Figure 1A:
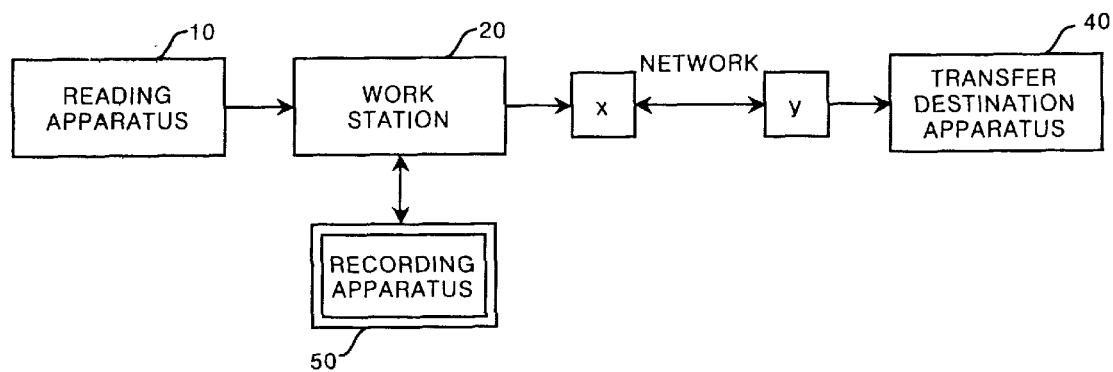
FIG. 1(A) is a diagram showing a configuration of a medical network system adopting an image confirming method of the present invention.

FIG. 1(A) is a diagram showing an outline configuration of a medical network system adopting a first embodiment of the image confirming method of the present invention. The medical network system comprises an image data acquiring apparatus (reading apparatus) 10 which obtains image data representing an image, an image reading terminal (workstation) 20 which is connected to the reading apparatus 10 and displays the image based on the image data input from the reading apparatus, and a transfer destination apparatus 40 which is connected to the workstation 20 via the network. The workstation 20 and the transfer destination apparatus 40 are connected by connecting a connection point x of the workstation 20 and a connection point y of the transfer destination apparatus 40. The image confirming method of the present invention is applicable not only to a network having a connection of such a kind but also to a network having a direct connection, not via a network, between the workstation 20 and the transfer destination terminal 40.

As the reading apparatus, not only the CR apparatus or a CT apparatus described in the above but also any apparatus which can obtain image data are used. If the CR apparatus is used, it can be used not only as the radiation image reading recording apparatus but also as a radiation image information reading apparatus alone which can input an image signal (image data) finally obtained to the workstation 20. FIG. 1(A) depicts the state wherein only one apparatus is connected as the reading apparatus 10. However, a plurality of apparatuses of different kinds or for different objects of examination are actually connected.

A recording apparatus 50 for temporarily storing image data input from the reading apparatus 10 is connected to the workstation 20. The recording apparatus 50 may be an image server such as a web server connected via the network.

In the medical network system, the reading apparatus 10 obtains image data carrying a subject image by photographing the subject. The reading apparatus 10 has an image processing function and carries out image processing using a predetermined image processing condition on the obtained image data. The image data after the image processing are input to the workstation 20.

The workstation 20 temporarily stores the image data input from the reading apparatus 10 in the recording apparatus 50. At the time of image confirmation, necessary image data are read from the recording apparatus 50, and the image based on the image data is displayed on a CRT (not shown). An operator confirms whether or not the displayed image has predetermined quality while viewing the image (the detail will be explained later), and only image data having no problem are transferred to the transfer destination apparatus 40 via the network.

Figure 1B:
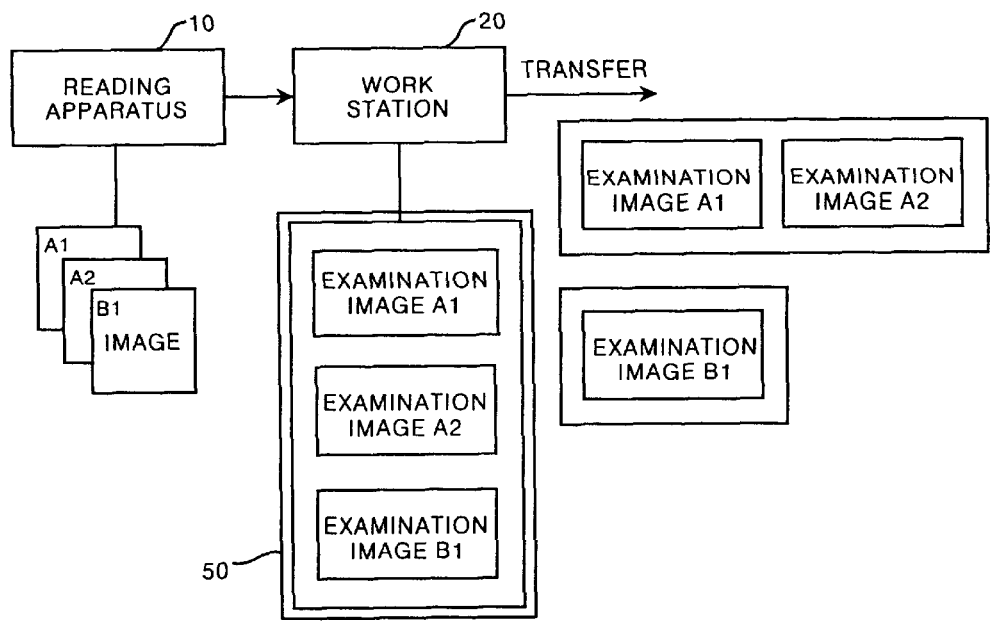
FIG. 1(B) is a diagram showing a workstation and its peripherals explaining the image confirming method.

The image confirming method of the present invention using the workstation 20 will be explained next with reference to the configuration of the peripherals of the workstation 20 of the medical network system shown in FIG. 1(B).

Figure 3:
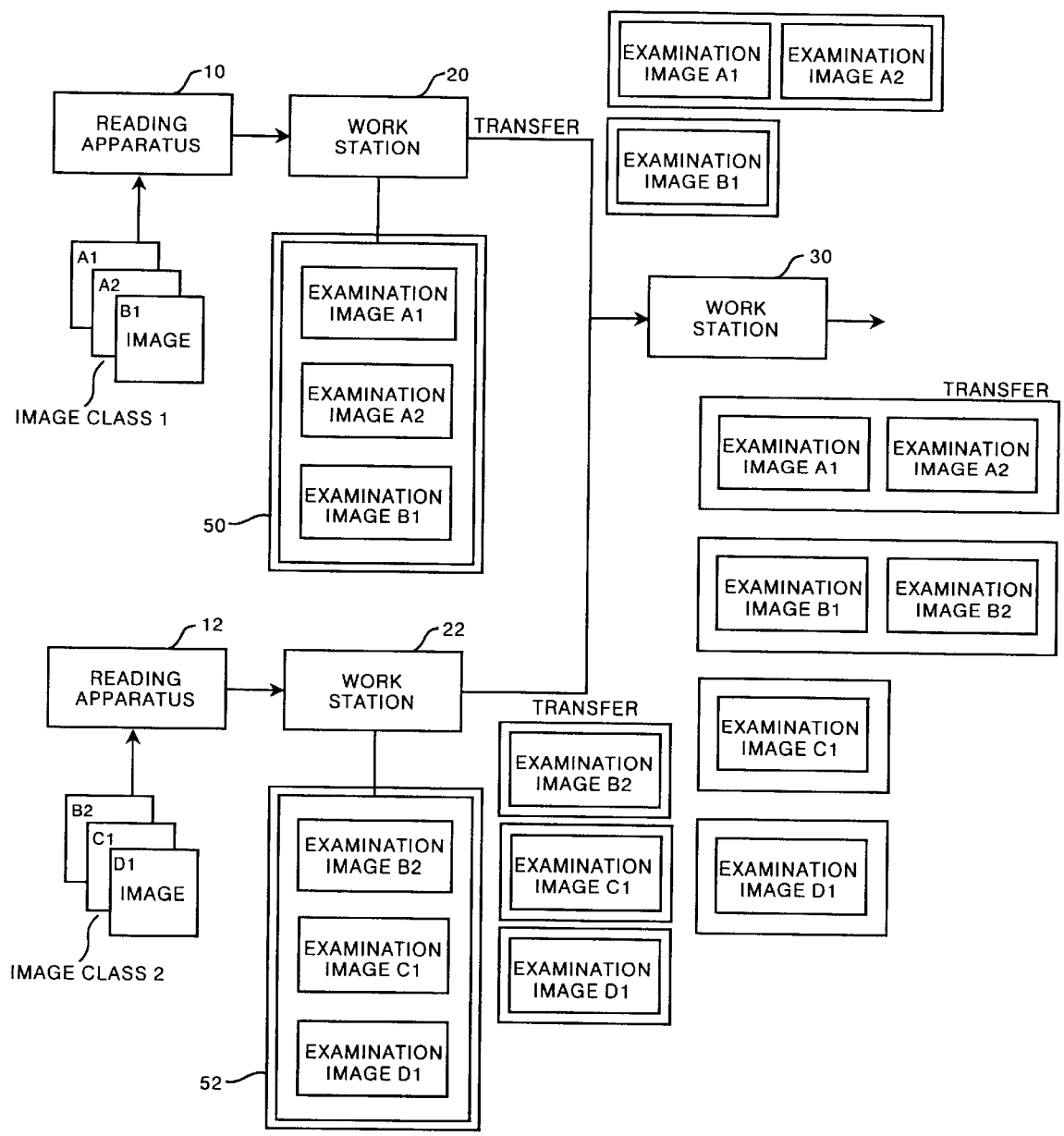
FIG. 3 is a diagram showing workstations and their peripherals explaining still another embodiment of the image confirming method.

The recording apparatus 50 stores multitudes of image data obtained by the reading apparatus 10. For example, as shown in FIG. 1(B), 3 images A1, A2, and B1 are photographed by the reading apparatus 10 and image data carrying the images are stored in the recording apparatus 50. The images are obtained from one patient. The image A1 is a first image of stomach fluoroscopy (examination A) and the image A2 is a second image of the same examination (photographed at a position different from the position of the first image). The image B1 is a first image of a chest X-ray examination (examination B).

The workstation 20 classifies the image data carrying the 3 images A1, A2 and B1 stored in the recording apparatus 50 into a group of the examination A (group A) and a group of the examination B (group B). This process corresponds to a step of grouping according to the "examination objects" as the "common characteristic". For this grouping, header information, whereby the object of the examination (examination A or B) can be understood, has been added to each image data. The grouping of the image data having been read is carried out by referring to the header information. Alternatively, a database may be generated in advance so that a location of each image can be searched for and the grouping is carried out by referring to the database. Reading the image data at the time of display thereof may be carried out based on the search of the database.

Out of the image groups A and B classified in the grouping step, all images (images A1 and A2) of the group A, which includes a plurality of images, are displayed, and image quality is confirmed by comparing the displayed images. It is not necessary to display the images A1 and A2 at once, and the images can be compared to each other while switching between them. In the case of such a comparison, since the images A1 and A2 have different photographing positions, a discussion about whether or not a lesion which is observed in one image but not in the other is due to the photographing position or whether or not re-photographing is necessary (that is, whether or not photographing at a slightly different position or density or the like is necessary) becomes possible by not only a simple observation of the image A1 or A2 respectively but also the comparison between them. Only when the obtained image data are judged to be sufficient, are the images A1 and A2 having been confirmed transferred collectively to the transfer destination apparatus 40. The transfer destination apparatus 40 receiving the images in the group A can obtain both images A1 and A2 collectively by specifying the group A, and it is not necessary for the transfer destination apparatus 40 to specify the image A1 or A2 respectively.

As has been described in the above, according to the image confirming method of the present invention, it becomes possible to identify a problem which cannot be identified by observing the image A1 or A2 respectively, and images enabling more precise diagnosis can be transferred to the transfer destination apparatus 40.

The group B has only the one image B1, and the image confirming method of the present invention is not carried out thereon. However, it is needless to say that confirmation of a single image which has been carried out conventionally is carried out on that one image.

Figure 2:
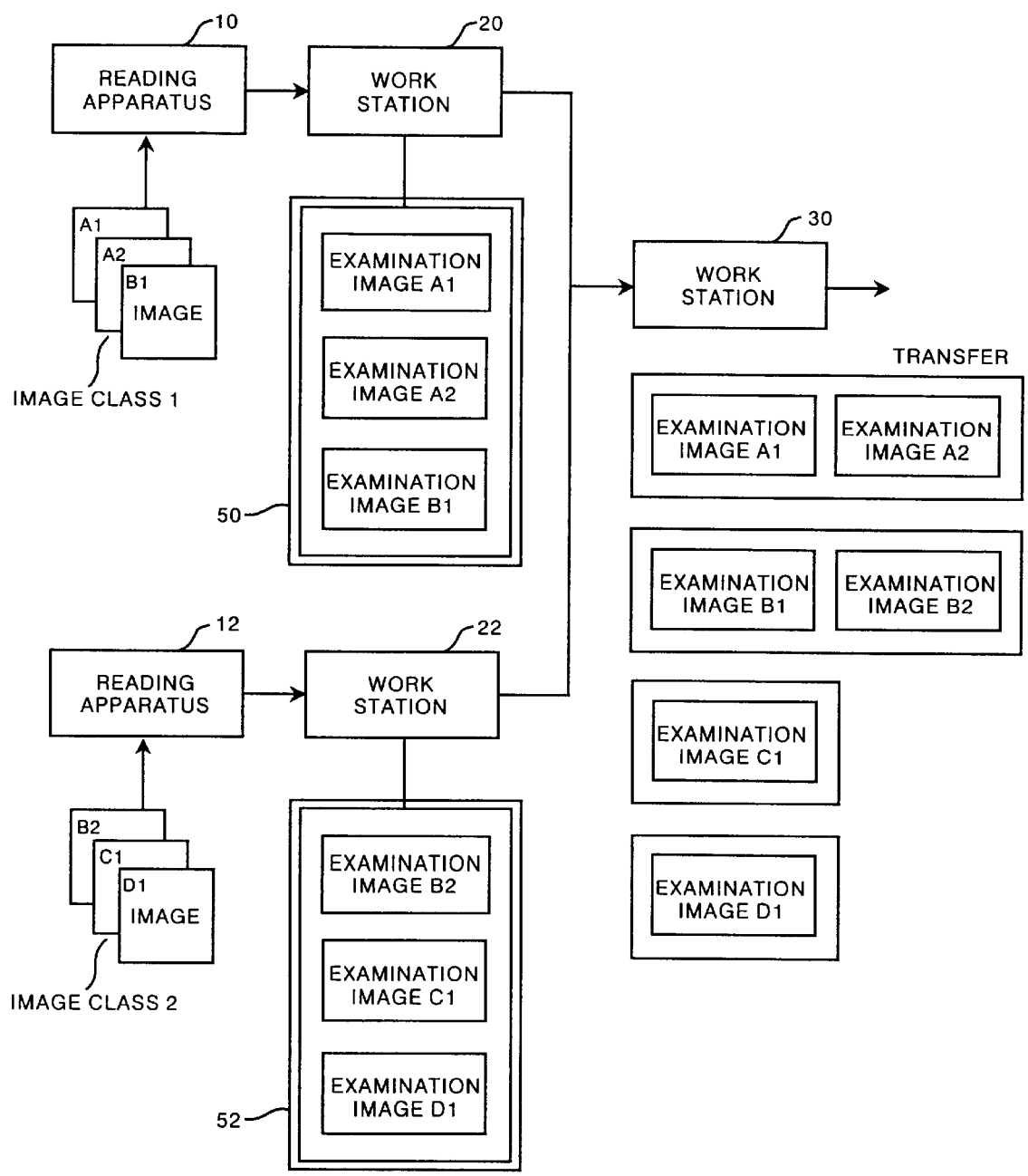
FIG. 2 is a diagram showing workstations and their peripherals explaining another embodiment of the image confirming method.

The medical network system in the above configuration has only one connection between the reading apparatus 10 and the workstation 20. It is also possible to have a plurality of connections between reading apparatuses and workstations for carrying out image confirmation. FIG. 2 shows this aspect.

A medical network system in FIG. 2 comprises reading apparatuses 10 and 12 for obtaining image data representing images, a workstation 20 which is connected to the reading apparatus 10 and displays the images based on the image data input from the reading apparatus 10, a workstation 22 which is connected to the reading apparatus 12 and displays the images based on the image data input from the reading apparatus 12, a workstation 30 which displays the images based on the image data input from both workstations 20 and 22, and a transfer destination apparatus 40 connected to the workstation 30 (the connection mode is the same as in FIG. 1(A) and not shown in FIG. 2).

In this medical network system, the reading apparatuses 10 and 12 respectively photograph subjects and acquire image data carrying the subject images. The reading apparatus 10 carries out predetermined image processing using a predetermined image processing condition on the obtained image data and inputs the image data after the image processing to the workstation 20. At the same time, the reading apparatus 12 inputs the image data after the image processing to the workstation 22.

The workstation 20 temporarily stores the image data input from the reading apparatus 10 in a recording apparatus 50 connected to the workstation 20. The workstation 22 temporarily stores the image data input from the reading apparatus 12 in a recording apparatus 52 connected to the workstation 22. For example, as shown in FIG. 2, 3 images A1, A2, and B1 (an image class 1) are photographed by the reading apparatus 10 and image data representing the images are stored in the recording apparatus 50. Likewise, 3 images B2, C1, and D1 (an image class 2) are photographed by the reading apparatus 12 and image data representing the images are stored in the recording apparatus 52. In the image class 1, the image A1 is a first image of stomach fluoroscopy (examination A) and the image A2 is a second image of the same examination (photographed at a position different from the position of the first image). The image B1 is a first image of a chest X-ray examination (examination B). In the image class 2, the image B2 is a second image of the chest X-ray examination (examination B) and the image C1 is a first image of an examination C (different from the examinations A and B). The image D1 is a first image of an examination D (different from the examinations A, B and C). These images are obtained from one patient.

The workstation 30 reads, via the workstation 20, image data representing the 3 images A1, A2 and B1 of the image class 1 stored in the recording apparatus 50, and reads, via the workstation 22, image data representing the 3 images B2, C1 and D1 of the image class 2 stored in the recording apparatus 52. All image data having been read are grouped into an examination-A group (an image group A), an examination-B group (an image group B), an examination-C group (an image group C) and an examination-D group (an image group D). This process corresponds to a step of grouping according to the "objects of examination" as the "common characteristic".

Among the groups A to D classified in the grouping step, image confirmation according to the present invention is carried out on the groups A and B each of which includes a plurality of images. At the time of the confirmation, since the images B1 and B2 were photographed in different environments (for example, by different photographing apparatuses or on a different photographing date), not only confirmation of respective image B1 or B2 but also confirmation regarding a problem which cannot be identified by a simple observation of the image B1 or B2 respectively is carried out by comparison between the images B1 and B2. Only when the obtained image data are judged to be sufficient, are the images B1 and B2 having been confirmed collectively transferred to the transfer destination apparatus 40. For the group A, image confirmation is carried out in the same manner as has been described above, and the images A1 and A2 having been confirmed are collectively transferred to the transfer destination apparatus 40.

The transfer destination apparatus 40 having received the images in the image groups A and B can obtain the images A1 and A2 in the image group A or images B1 and B2 in the image group B by simply specifying the image group A or B. It is not necessary for the transfer destination apparatus 40 to respectively specify the images A1 and A2 or the images B1 and B2.

As has been described in the above, even in the aspect wherein the reading apparatuses and the workstations for image confirmation are connected by a plurality of connections, a problem which cannot be identified by observation of each image in an image group can be identified, and images enabling more precise diagnosis can be transferred to the transfer destination apparatus 40.

A second embodiment of the image confirming method of the present invention will be explained below. FIG. 3 shows an outline of peripherals of workstations in a medical network system adopting the second embodiment of image confirming method.

The medical network system comprises reading apparatuses 10 and 12 for obtaining image data carrying images, a workstation 20 which is connected to the reading apparatus 10 and displays the image based on the image data input from the reading apparatus 10, a workstation 22 which is connected to the reading apparatus 12 and displays the image based on the image data input from the reading apparatus 12, a workstation 30 which displays images based on the image data input from both workstations 20 and 22, and a transfer destination apparatus 40 connected to the workstation 30 via the network (the connection mode is the same as in FIG. 1(A) and not shown in FIG. 3).

In this medical network system, the reading apparatuses 10 and 12 respectively photograph subjects and acquire image data representing the subject images. The reading apparatus 10 carries out predetermined image processing using a predetermined image processing condition on the obtained image data and inputs the image data after the image processing to the workstation 20. At the same time, the reading apparatus 12 inputs the image data after the image processing to the workstation 22.

The workstation 20 temporarily stores the image data input from the reading apparatus 10 in a recording apparatus 50 connected to the workstation 20. The workstation 22 temporarily stores the image data input from the reading apparatus 12 in a recording apparatus 52 connected to the workstation 22. For example, as shown in FIG. 3, 3 images A1, A2, and B1 (an image class 1) are photographed by the reading apparatus 10 and image data representing the images are stored in the recording apparatus 50. Likewise, 3 images B2, C1, and D1 (an image class 2) are photographed by the reading apparatus 12 and image data representing the images are stored in the recording apparatus 52. In the image class 1, the image A1 is a first image of stomach fluoroscopy (examination A) and the image A2 is a second image of the same examination (photographed at a position different from the position of the first image). The image B1 is a first image of a chest X-ray examination (examination B). In the image class 2, the image B2 is a second image of the chest X-ray examination (examination B) and the image C1 is a first image of an examination C (different from the examinations A and B). The image D1 is a first image of an examination D (different from the examinations A, B and C). These images are obtained from one patient.

The workstation 20 classifies the image data representing the 3 images A1, A2, and B1 in the image class 1 stored in the recording apparatus 50 into an examination-A group (a subgroup A) and an examination-B group (a subgroup B). Likewise, the workstation 22 classifies the image data representing the 3 images B2, C1, and D1 in the image class 2 stored in the recording apparatus 52 into an examination-B group (a subgroup B), an examination-C group (a subgroup C), and an examination-D group (a subgroup D). This process corresponds to the first grouping step of each image class using the "object of examination" as the "common characteristic". The image data classified into the subgroups are input to the workstation 30 as the image subgroups and stored in a recording apparatus which is not shown in FIG. 3. The image data may be input to the workstation after the confirmation of the images grouped in the first grouping step, in the same manner as in the first embodiment.

The workstation 30 classifies the subgroups A and B in the class 1 and the subgroups B, C, and D in the class 2 classified at the first grouping step into groups of images having a common characteristic by integrating the above subgroups, and leaves the subgroups as they are when the subgroups have no other images of common characteristic in other subgroups (this process corresponds to the second grouping step). Therefore, since there are no subgroups having images of the examination A in the class 2, the subgroup A in the class 1 stays as it is, having images A1 and A2. The subgroup B including the image B1 in the class 1 and the subgroup B including the image B2 in the class 2 have the images of the examination B. Therefore, they are integrated as a group B. The subgroups C and D in the class 2 remain as they are, having one image each (C1 or D1) in the subgroups. For the second grouping step, information showing the object of the examination (the examination A, B, C, or D) may be recorded as header information or the like corresponding to each subgroup, for example. Alternatively, a database may be generated.

Among the groups or subgroups A to D classified in the second grouping step, image quality confirmation is carried out on all images in the groups A and B including a plurality of images (images A1 and A2, and images B1 and B2).

At the time of confirmation, since the images B1 and B2 were photographed in different environments (by different photographing apparatuses or on different date for example), the images B1 and B2 are confirmed not only by observation of each image but also by comparison between both images so that a problem which cannot be identified by a simple observation of each image can be identified only when the image data having been obtained are judged to be appropriate, the images B1 and B2 having been confirmed are transferred collectively as the images in the image group B to the transfer destination apparatus 40. For the image group A, the images are confirmed by the same method as in the first embodiment, and the images A1 and A2 having been confirmed are transferred collectively as the images in the image group A to the transfer destination apparatus 40.

The transfer destination apparatus 40 having received the images of groups A and B can obtain images A1 and A2 included in the group A or images B1 and B2 included in the group B, only by specifying the group A or B. It is thus not necessary for the transfer destination apparatus 40 to respectively specify the images A1 and A2 or images B1 and B2.

As has been described in the above, according to the second embodiment of the image confirming method of the present invention, a problem which cannot be identified by a simple observation of each image can be identified by collective confirmation of the image group including a plurality of images. Therefore, images enabling greater accuracy of diagnosis can be transferred to the transfer destination apparatus 40.

The groups C and D have only one image each (image C1 or D1), and the image confirming method of the present invention is not applicable thereto. However, it is needless to say that a conventional confirmation of one image is carried out on those single images.

What is claimed is:

1. A medical image confirming method comprising:
   a grouping step wherein a plurality of medical images are classified into image groups, each having a common characteristic;
   a confirmation step, wherein regarding each image group including a plurality of medical images and classified in the grouping step, quality of the medical image in the image group is confirmed by referring to other medical images in the image group, wherein
   predetermined processing can be carried out on the image group having been confirmed.

2. The method of claim 1, wherein the grouping step comprises classifying images stored as separate sheets of images into the image groups, and wherein in the confirmation step, referring to other images comprises referring to at least one separate sheet of image in the image group.

3. The method of claim 1, wherein the grouping step further comprises identifying a given image which shares no common characteristic with another image, and the given image does not undergo the confirmation step.

4. The method of claim 3, wherein the given image does not undergo the confirmation step but does undergo said predetermined processing.

5. The method of claim 1, wherein the quality of the medical image in the confirmation step comprises determining at least one of: adequacy of contrast in the image in comparison to another image in the image group, density of the image in comparison with another image in the image group and a view angle of the image.

6. The method of claim 1, wherein the quality of the image in the image group is determined as the image is displayed on a display device.

7. A medical image confirming method comprising:
   a first grouping step wherein regarding image classes each of which includes a plurality of medical images, the medical images included in each image class is grouped into image subgroups, each having a common characteristic;
   a second grouping step wherein, regarding the image subgroups grouped in the first grouping step, image subgroups having the same characteristic of the medical images included therein are grouped together to form an image group, and an image subgroup having no other image subgroups of common characteristic remains as it is; and
   confirmation step wherein, regarding each image group grouped in the second grouping step and having a plurality of medical images, quality of each medical image therein is confirmed by referring to other medical images in the image group, wherein
   predetermined processing can be carried out on each medical image group or subgroup grouped in the second grouping step.

8. The method of claim 7, wherein the confirmation step to determine quality of an image comprises determining at least one of adequacy of contrast in the image in comparison to another image in the image group; density of the image in comparison to another image in the image group and adequacy of a view angle of the image.

9. The method of claim 7, wherein the second grouping step comprises classifying images stored as separate sheets of images of the image subgroups from the first grouping step into the image groups, and wherein in the confirmation step, referring to other images comprises referring to at least one separate sheet of image in the image group.

10. The method of claim 1, wherein the first and second grouping steps each further comprise identifying a given image which shares no common characteristic with another image, and the given image does not undergo the confirmation step.

11. The method of claim 10, wherein the given image does not undergo the confirmation step but does undergo said predetermined processing.

12. The method of claim 7, wherein the first and second grouping steps are each performed on images originating from different types of imaging machines.

13. The method of claim 7, wherein the quality of the image in the image group is determined as the image is displayed on a display device.

14. An image confirming method as claimed in claim 1 or 7, wherein the grouping step or the first grouping step is a step of confirming whether an image belongs to an image group by referring to or comparing accompanying information of each image (such as patient information and clinical examination information).

15. The method of claim 1, wherein the accompanying information comprises a header.

16. An image confirming method as claimed in claim 1 or 7, wherein the grouping step or the first grouping step is a step of confirming whether an image belongs to an image group by referring to or comparing information obtained through a search of a database storing and managing information regarding the images, based on information to define identity of the group.

17. An image confirming method as claimed in claim 1 or 7, wherein the predetermined processing carried out on the image group having been confirmed is any one of the following processing:
   (1) transfer of images belonging to the group to an external apparatus,
   (2) recording of images belonging to the group on a film,
   (3) display of images belonging to the group,
   (4) storing images belonging to the group in a recording apparatus,
   (5) erasing or preventing erasing of images belonging to the group, and
   (6) editing information on images belonging to the group.

18. The method of claim 17, wherein the predetermined processing is carried out on the image group collectively.

* * * * *